United States Patent [19]
Linthicum et al.

[11] Patent Number: 5,379,970
[45] Date of Patent: Jan. 10, 1995

[54] MOUNTING BRACKET ARRANGEMENT

[75] Inventors: Steven E. Linthicum, Fairfield; Wilson T. Guy, Cincinnati, both of Ohio

[73] Assignee: General Electric Company, Cincinnati, Ohio

[21] Appl. No.: 42,183

[22] Filed: Apr. 2, 1993

[51] Int. Cl.[6] ............................................. B64D 27/00
[52] U.S. Cl. ......................................... 244/54; 29/525.1; 403/19; 248/550; 60/39.31
[58] Field of Search ............................. 244/54, 53 R; 248/544–545, 1, 200, 550–557; 29/526 R; 403/19; 60/39.31

[56] References Cited

U.S. PATENT DOCUMENTS

| Re. 18,457 | 5/1932 | Lord | 244/54 |
|---|---|---|---|
| 2,060,604 | 11/1936 | Bartlett | 248/544 |
| 2,815,184 | 12/1957 | Westphal et al. | 244/54 |
| 2,944,766 | 7/1960 | Freeding et al. | 244/54 |
| 4,079,981 | 3/1978 | Mahler et al. | 244/54 |
| 4,346,861 | 8/1982 | Legrand et al. | 244/54 |
| 4,444,373 | 4/1984 | Hayashi | 248/544 |
| 4,519,480 | 5/1985 | Nelson | 248/544 |
| 5,253,944 | 10/1993 | Preston | 244/54 |

FOREIGN PATENT DOCUMENTS 734372  4/1943  Germany ............... 244/54

*Primary Examiner*—Galen L. Barefoot
*Attorney, Agent, or Firm*—Jerome C. Squillaro; Bernard E. Shay

[57] ABSTRACT

A mounting means is adapted to hold a large component while it is being bolted to a frame. A hook is attached to the component and adapted to suspend the component in a first position. A bracket is attached to the frame and is adapted to receive the hook, hold the component in the first position, and align the component with a mounting bolt. The component is then drawn to a second, installed, position as the mounting bolt is tightened.

5 Claims, 3 Drawing Sheets

MOUNTING BRACKET ARRANGEMENT

BACKGROUND OF THE INVENTION

The present invention relates to mounting brackets for aircraft engine systems and, more particularly, to a mounting bracket arrangement for line replaceable units on aircraft engines.

It is well known in the art to provide mounting brackets to allow installation of shock-mounted components in an aircraft engine system. For example, such mounting brackets are provided as engine mounting brackets on which to mount a control unit incorporating shock-mounts.

Unfortunately, such mounting brackets require at least two people to achieve the installation. One, and sometimes two, people are required to position and hold the component in place against the mounting brackets, and an additional person is needed to install and/or tighten mounting bolts. The existing mounting method, then, has the added expense of requiring two or three persons to do the job of one person, without decreasing the amount of time needed to complete the job. Furthermore, positioning the component and then maintaining the weight of the component in position until it is installed, can be a very tedious process.

It is therefore highly desirable and an object of the present invention to provide a mounting arrangement in which the mounting means is self-supporting, overcoming the disadvantages of the prior art, particularly the need for additional workers.

Another object of the present invention is to provide a mounting means on which to mount a control unit incorporating shock-mounts that are required to provide freedom of movement in three axes when installed.

These objects and other features and advantages will become more readily apparent in the following description when taken in conjunction with the appended drawings.

SUMMARY OF THE INVENTION

The present invention has been developed to fulfill the needs noted above. The mounting arrangement of the present invention includes protruding hook accepting means to provide support for component hooks. The hooks and hook engaging means allow the component to hang in an aligned, suspended position while the maintainer obtains tools for installation. Only slight hand pressure is required to push the mount bolts into engagement and complete the installation. The use of self-disengaging hooks and hook accepting means allows the installation task to be accomplished by a single maintainer, rather than by two or more people as previously required.

Briefly, in accordance with one aspect of the present invention, a mounting means holds a component while it is being bolted to a frame. A hook is attached to the component and adapted to suspend the component in a first position. A bracket is attached to the frame and is adapted to receive the hook, hold the component in the first position, and align the component with a mounting bolt. The component is then drawn to a second position as the mounting bolt is tightened.

In the drawings as hereinafter described, a preferred embodiment is depicted; however, various other modifications and alternative constructions can be made thereto without departing from the true spirit and scope of the invention. For example, the mounting brackets can include a variety of hooks, pins, slots, and protrusions. The general concept can also be extended to mounting various components in the aircraft and other industries, and is particularly advantageous for vibration mounted components.

DETAILED DESCRIPTION OF THE PREFERRED EMBODIMENTS

Figure 1:
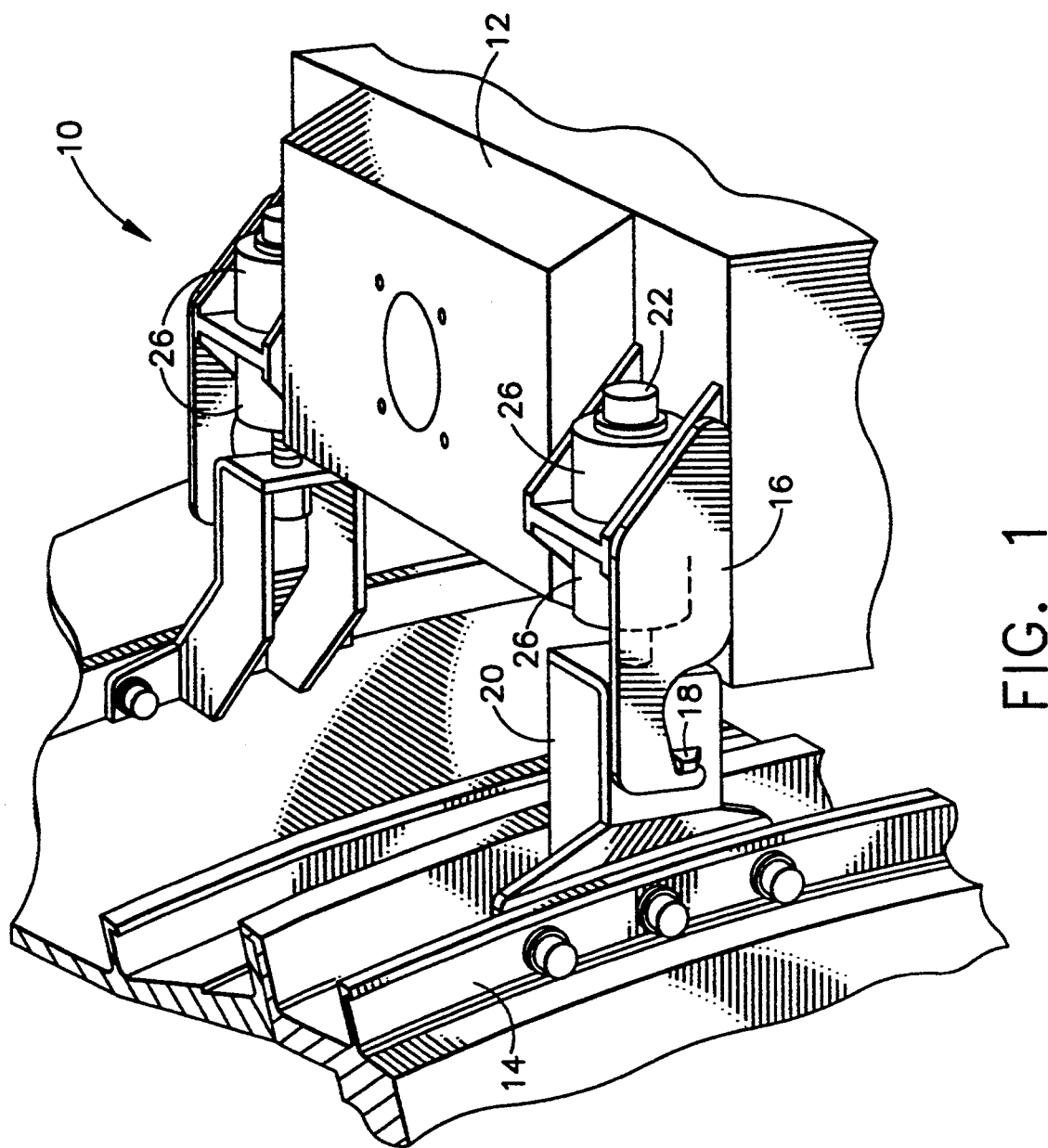
FIG. 1 illustrates the mounting means of the present invention holding a component in a first, suspended position.
Figure 2:
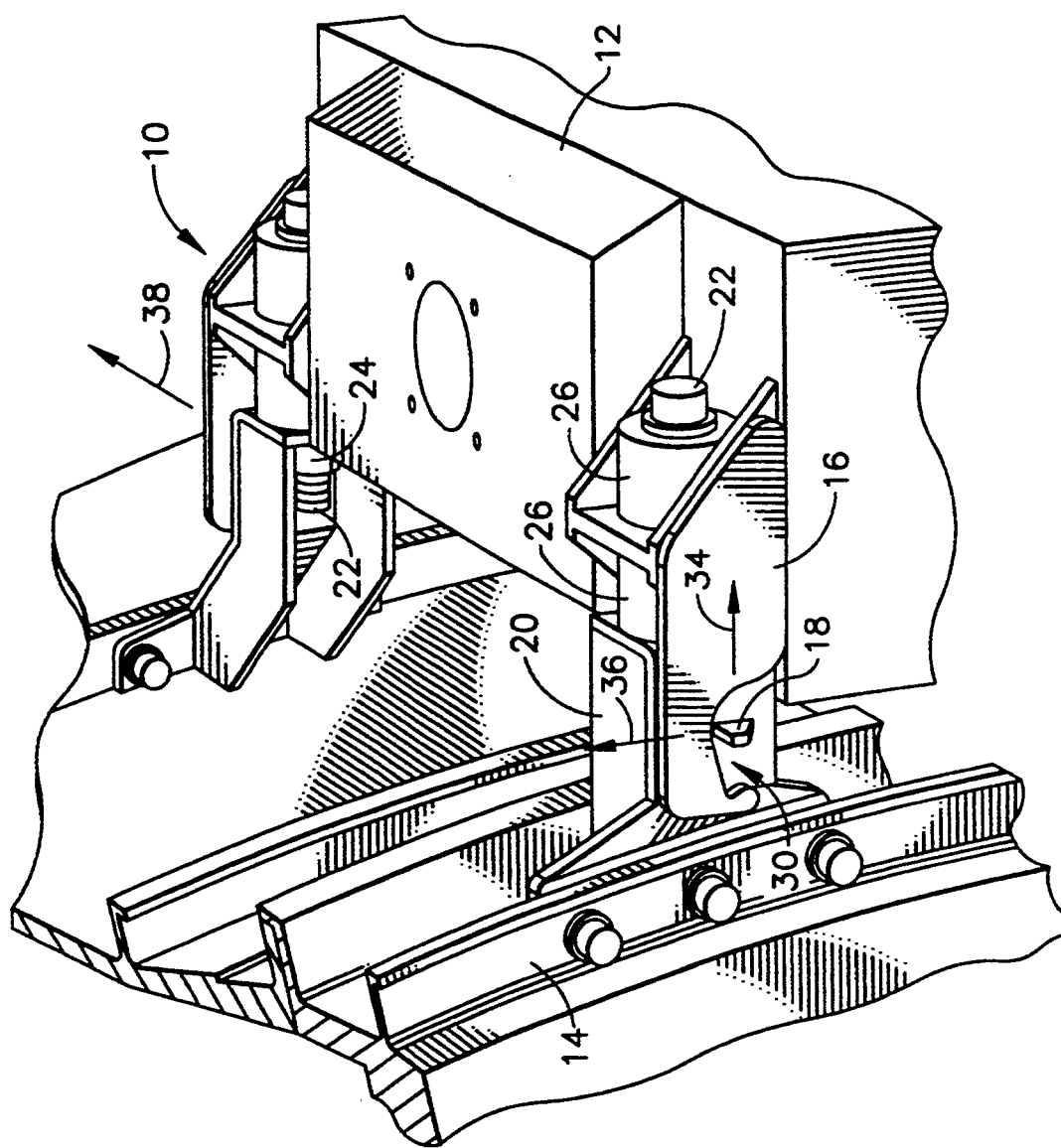
FIG. 2 illustrates the mounting means of the present invention holding a component in a second, installed position.

Referring now to the drawings, in FIGS. 1 and 2 there is illustrated a mounting means 10 in accordance with the present invention. The mounting means 10 is adapted to hold a large component 12 while it is being bolted to a frame 14. In FIG. 1, the component 12 is being held in a suspended position, and in FIG. 2, the component 12 is being held in an installed position.

When the component 12 is ready for installation, the component 12 is lifted up and suspended by a hook 16, attached to the component 12. The hook 16 engages with a hook receiving or accepting means, such as protrusion 18, adapted to suspend the component 12 in a first or suspended position, as illustrated in FIG. 1. The hook accepting means 18 is associated with a bracket 20 attached to the frame 14. The bracket 20, including the hook receiving means 18, receives the hook 16 to hold the component 12 in the first position, and also to align the mounting bolt 22 with the bracket 20. As the mounting bolt 22 is tightened, the component 12 is drawn into an installed, second position, as illustrated in FIG. 2.

The component 12 is shifted to the second position as the mounting bolt 22 is tightened. To accomplish this, in a preferred embodiment, the mounting bolt 22 is aligned with a nut plate 24, shown in FIG. 2, which includes a threaded hole therethrough. The alignment occurs when the component 12 is suspended in the first position of FIG. 1. The bolt 22 is adapted to engage the threaded hole of the nut plate 24, thereby shifting the component 12 to the second position of FIG. 2 when the bolt is tightened.

In a further preferred embodiment, the bracket 20 may also include vibration isolators 26, such as rubber, for shock absorbency. The bolt 22, then, is adapted to fit through the vibration mounting 26 and then engage the threaded hole of the nut plate 24.

Figure 3:
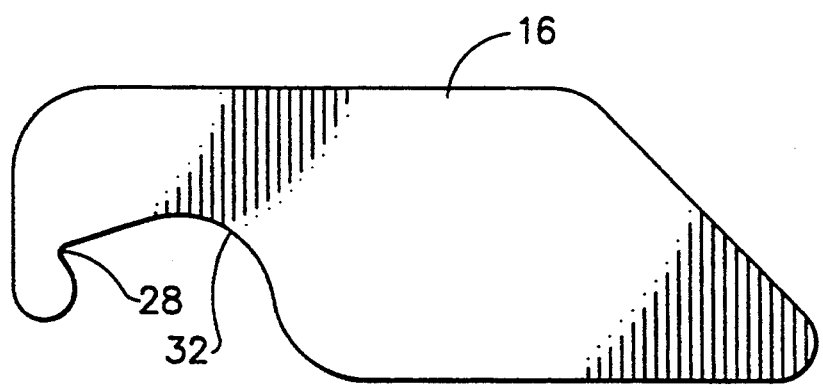
FIG. 3 illustrates a hook means associated with the mounting means of the present invention.
Figure 4:
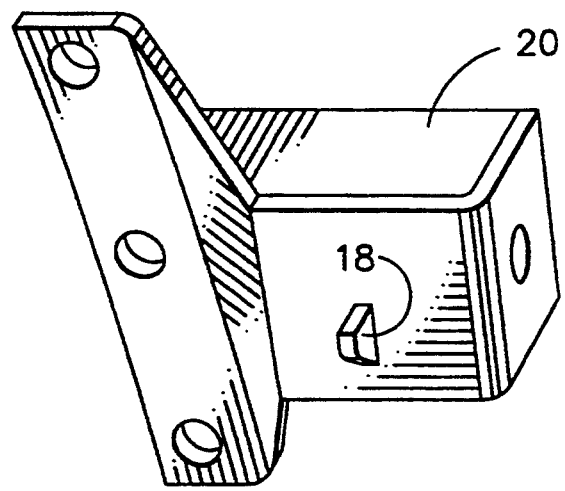
FIG. 4 illustrates a hook accepting means associated with the mounting means of the present invention.

The mounting arrangement of the present invention includes hooks 16, as illustrated in FIG. 3, and protruding hook accepting means 18, as illustrated in FIG. 4, which provide support for the hooks 16. The hooks 16 and hook engaging means 18 allow the component 12 to hang in an aligned, suspended position while the maintainer prepares to install the component 12 on the frame 14. Only slight hand pressure is required to push the mounting bolts 22 into engagement and complete the installation.

Referring to FIGS. 3 and 4 and continuing with FIGS. 1 and 2, when the component 12 is in the suspended position of FIG. 1, the protruding hook engaging means 18 actually contact the hook 16, in a notch 28. However, when the component 12 is in the installed position of FIG. 2, the hook engaging means 18 are disengaged from the hook 16, leaving an area of clearance 30.

The area of clearance 30 is achieved by including the curvature 32 at the engaging portion of the hook 16. The clearance 30 is desired to prevent the hook 16 from striking the hook engaging means 18 during vibration of the frame 14. The vibration isolators 26 allow a certain amount of movement of the component 12 for vibration dampening, for example, approximately 0.30 inches. Therefore, the clearance 30 is needed to prevent the hook 16 from hitting anything, which can cause damage as the component 12 is "vibrating". Since the clearance 30 is achieved automatically as the bolt 22 is tightened, the hook 16 is actually maintenance friendly in preventing contact during movement of the component 12.

The use of self-disengaging hooks and hook accepting means allows the installation task to be accomplished by a single maintainer. The use of self-disengaging hooks and hook accepting means also provides a mounting means incorporating freedom of movement in three axes when installed, including the x-axis in the direction of arrow 34, the y-axis in the direction of arrow 36, and the z-axis in the direction of arrow 38, as illustrated in FIG. 2.

The present invention is particularly advantageous for use in installing heavy vibration mounted components. However, the concept of using hooks and/or hook engaging means to suspend and install a component can obviously be applied to alternative constructions. For example, in an alternative embodiment, a pair of self-disengaging hooks enter elliptical holes in the mount brackets. Tightening the mount bolts moves the hooks from the small radius end of the holes to the larger end, thus providing the required installed clearances.

It is seen from the foregoing, that the objectives of the present invention are effectively attained, and, since certain changes may be made in the construction set forth, it is intended that matters of detail be taken as illustrative and not in a limiting sense.

What is claimed is:

1. A mounting means comprising:
    a hook attached to a component and adapted to suspend the component in a first position;
    a bracket attached to a frame, the bracket including:
        a nut plate;
        a protrusion adapted to receive the hook and hold the component in the first position such that the nut plate is aligned with a mounting bolt on said component; and
        the mounting bolt being adapted to draw the component to a second position as the mounting bolt is tightened.

2. A mounting means as claimed in claim 1 wherein the second position is an installed position.

3. A mounting means as claimed in claim 1 further comprising a vibration mounting in the bracket.

4. A mounting means as claimed in claim 1 wherein the hook is permanently attached to the component.

5. A mounting means as claimed in claim 1 wherein the hook includes a curvature such that the hook disengages from the protrusion when the component is in the second position.

* * * * *